UNITED STATES PATENT OFFICE.

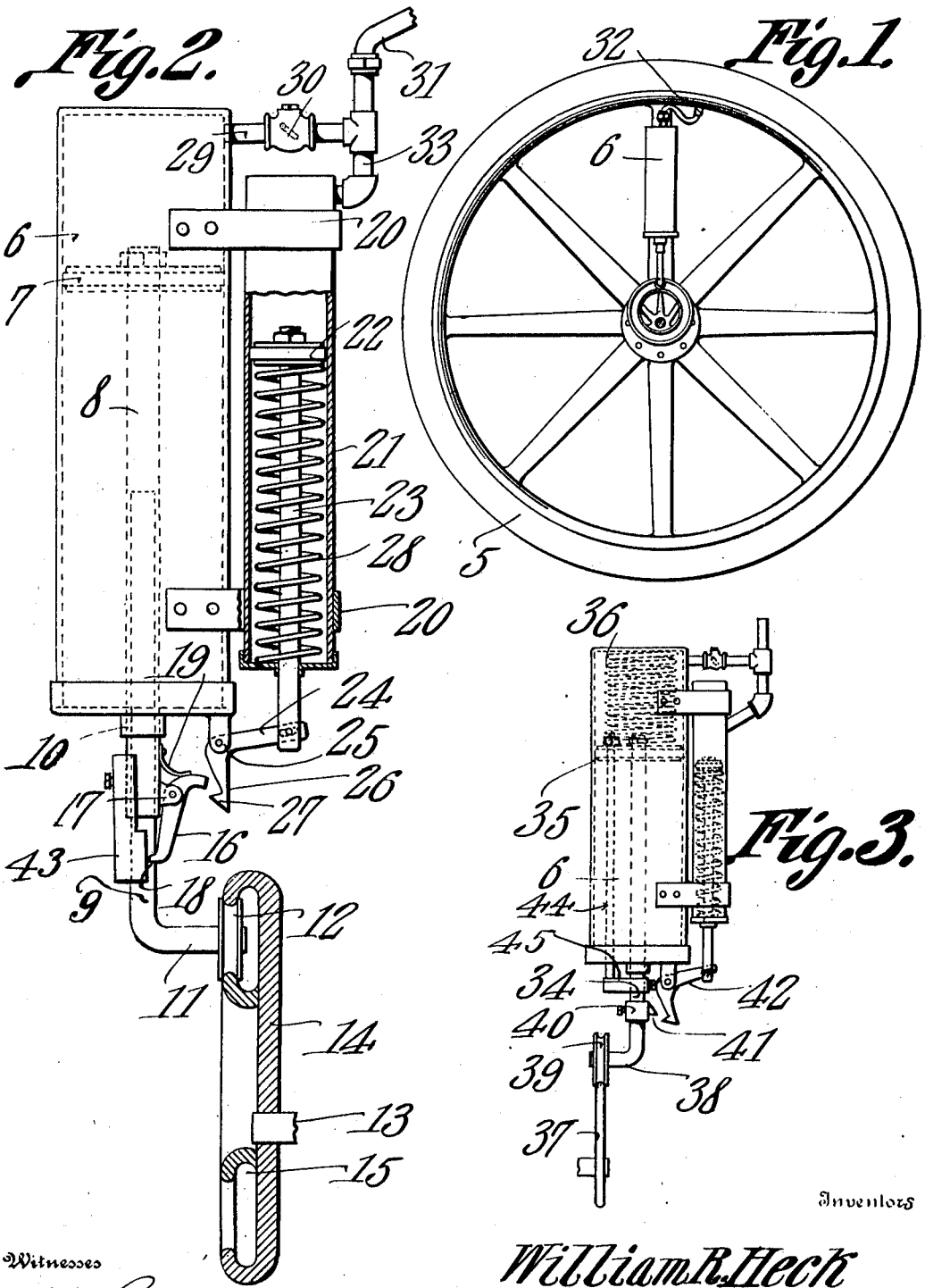

WILLIAM R. HECK, OF PALMER, NEBRASKA, ASSIGNOR OF ONE-HALF TO ADAM F. HECK, OF PALMER, NEBRASKA.

TIRE-INFLATER.

970,329.  Specification of Letters Patent.  Patented Sept. 13, 1910.

Application filed March 28, 1910. Serial No. 552,030.

*To all whom it may concern:*

Be it known that I, WILLIAM R. HECK, a citizen of the United States, residing at Palmer, in the county of Merrick and State of Nebraska, have invented a new and useful Tire-Inflater, of which the following is a specification.

This invention relates to tire inflaters designed for automatically inflating pneumatic tires of automobiles and other vehicles while the vehicle is in motion.

It is the object of the invention to provide a simple and efficient device of the kind stated, which can be readily mounted on existing forms of wheels, and also to provide a governor which may be set to start the operation of the pump when the pressure in the tire drops below a certain point, and which stops the operation of the pump when the tire is again pumped up to this pressure.

The herein stated objects are attained by a novel construction and arrangement of parts to be hereinafter described and claimed, and illustrated in the accompanying drawing, in which drawing, Figure 1 is a front elevation of a wheel showing the application of the invention. Fig. 2 is a side elevation of the device, partly in section. Fig. 3 is a side elevation of a slightly modified form of apparatus.

In the drawing, 5 denotes the wheel to which the invention is applied. On one of the spokes of this wheel is made fast, in any suitable manner, the cylinder 6 of an air pump. In the pump cylinder works a plunger 7, to which is connected an operating stem consisting of two telescoping sections 8 and 9, respectively, said sections being slidably connected for a purpose to be presently described. This plunger stem extends from one end of the cylinder, through a suitable stuffing box 10, and the inner section 9 of said stem terminates in a lateral bend 11 carrying a small wheel 12.

To the axle 13 of the wheel 5 is fixed an eccentric 14 having one of its faces provided with an annular groove 15 in which the wheel 12 works. This groove is formed by two spaced and concentric annular flanges having their outer edges extending inwardly so as to engage the rim of the wheel 12, said rim being grooved to receive the edges of the flanges. It will be evident from the foregoing that the pump plunger 7 is reciprocated in the cylinder 6 when the wheel 5 is in motion. The wheel is loose on the axle 13, the latter being stationary, and as the eccentric 14 is fixed to the axle, and the pump cylinder is fixed to the wheel, the motion of the latter, through the eccentric and its connection with the plunger stem, reciprocates the plunger in the cylinder.

The pump is operated in the manner described when the plunger stem sections 9 and 10 are locked together, whereas, when said sections are unlocked, the section 9 slides up and down in the section 10, so that no motion is imparted to the plunger 7. The means for locking the plunger stem sections together comprise a dog 16 pivoted at 17 to the stem section 8 adjacent to its outer end. One end of this dog is shaped to enter a notch 18 made in the plunger stem section 9, and when thus engaging said notch, the two plunger stem sections are locked together. A spring 19 fastened at one end to the plunger stem section 8, and pressing with its free end on the toe of the dog 16, holds said dog in locking position.

Governor-controlled means are provided for releasing the dog 16 so as to place the pump in inoperative position, which means will now be described.

On one side of the pump cylinder 6, is mounted by means of brackets 20 or other suitable means, a cylinder 21, said cylinder extending parallel to the pump cylinder. In the cylinder 21 operates a plunger 22 to which is connected a stem 23 passing out of one end of the cylinder, and connected at its outer end to one of the branches 24 of an angle lever which is pivoted at 25 to that end or head of the pump cylinder from which the plunger stem extends. The other branch 26 of the angle lever is formed with a hook 27.

Between the plunger 22 and that end of the cylinder 21 from which the stem 23 extends, a spring 28 is coiled around said stem. This spring is tensioned so as to slide the plunger 22 upwardly in the cylinder, and through the connections between said plunger and the angle lever, to swing the latter in a direction, to carry the hook 27 away from the toe of the dog 16. When the plunger 22 slides downwardly in the cylinder 21, the angle lever swings in the opposite direction, and its hook 27 comes into position below the toe of the dog 16. In this position, the dog will be tripped, and disengaged from the plunger stem section 9, thereby disconnecting said section from the plunger stem section 8, and placing the pump in inoperative position.

The pump outlet is a pipe 29 containing a check valve 30, and connected by a flexible hose or pipe 31 to the inlet nipple 32 of the tire of the wheel 5. The pipe 29 is also connected by a branch pipe 33 to the cylinder 21 above the plunger 22, or on that side of the plunger opposite its side which is engaged by the spring 28. The pressure in the cylinder 21 is therefore the same as the pressure in the tire, this pressure being opposed by the spring 28.

Fig. 2 shows the position of the parts when the pump is working, the two plunger stem sections being locked together by the engagement of the dog 16 with the notch 18. When the pressure in the tire becomes great enough to overcome the tension of the spring 28, the plunger 22 commences to move downwardly against said spring, whereupon the angle lever is swung on its pivot 25 in a direction to advance the hook 27 toward the toe of the dog 16. As soon as the hook comes into position below the toe of the dog, the latter is tripped, and swung in a direction to release the plunger stem section 9, whereupon the pump is thrown out of operation, the stem section 9 then reciprocating in the section 8, and the latter remaining stationary, so that no movement will be imparted to the pump plunger 7. The parts remain in this position until the pressure in the tire drops below a certain point, whereupon the greater tension of the spring 28 forces the plunger 22 upwardly in the cylinder 21, and the angle lever then swings in a direction to carry the hook 27 away from the toe of the dog 16. The latter then is swung forwardly by the spring 19, and when the notch 18 comes opposite the dog, the latter drops into said notch, and thus again locks the two plunger stem sections, whereupon the pump commences to operate. It will be evident from the foregoing that there is no danger of over-inflation of the tire, the pump being immediately thrown out of action when the desired pressure in the tire is reached, and the tire is also prevented from becoming flat for the reason that the pump is automatically started just as soon as the pressure in the tire drops below a certain point.

The parts constituting the herein described device are few and simple, and are therefore not liable to get out of order, by reason of which the apparatus is efficient and reliable in operation.

In the modified form of apparatus shown in Fig. 3, the sectional plunger stem is dispensed with, a solid stem 34 being provided. The pump plunger 35 is backed by a spring 36 serving to move said plunger in one direction. The plunger is moved in the opposite direction by a cam 37 made fast to the axle as before. The plunger stem terminates in a laterally extending end 38 carrying a small wheel 39 engaging the periphery of the cam 37, the periphery of the wheel 39 being grooved. To the plunger stem 34, on the outside of the pump cylinder, is fixed a collar 40 formed with a tooth 41, coöperating with a governor controlled angle lever 42 similar to the angle lever first described, for placing the pump in inoperative position.

The operation of the apparatus shown in Fig. 3 is as follows: When the tire is being pumped up, the angle lever 42 is in the position shown, its hooked end being out of the path of the tooth 41. The stem 34 is then free to reciprocate, and operates the plunger 35. When the desired pressure is reached in the tire, the angle lever 42 swings in a direction to position its hooked end in the path of the tooth 41, and when said tooth is engaged by the hooked end of the angle lever, the plunger stem 34 is held stationary, thus throwing the pump out of operation. It will be noted that the holding devices are so positioned that they operate when the plunger stem is at the limit of its upward travel, the spring 36 then being compressed by the plunger 35. When the plunger stem is again released by the pressure dropping in the tire, the spring expands, and moves the wheel 39 into engagement with the rim of the eccentric 37 if the latter happens to be in a position where it is out of engagement with said wheel.

In the form of pump shown in Fig. 2 the plunger stem section 9 is provided with a guide 43 which is carried by the plunger stem section 8 on the outside of the cylinder 6.

In the form of pump shown in Fig. 3 the plunger 35 carries a stem 44 which extends parallel to the stem 34, and passes out of the cylinder through the same end from which the said stem 34 extends. On the outside of the cylinder, the stems 34 and 44 are coupled by means of a collar 45 carried by the latter. This construction is provided for the purpose of preventing the plunger 35 from rotating in the cylinder.

What is claimed is:

1. An air pump comprising a cylinder, a plunger working therein, a plunger stem comprising telescoping and slidably connected sections, one of said sections having a notch, a pivoted dog carried by the other section, and adapted to engage the notch for locking the sections together, a releasing device for the dog, governor controlled means for operating the releasing device, and means connected to the plunger stem for operating the pump.

2. An air pump comprising a cylinder, a plunger working therein, a plunger stem comprising telescoping and slidably connected sections, one of said sections having a notch, a pivoted dog carried by the other section and adapted to engage the notch for locking the said sections together, an angle lever mounted on the pump cylinder, and located to extend into the path of the dog, for disengaging the same from the notch, governor controlled means connected to the lever for swinging the same into and out of the path of the dog, and means connected to the plunger stem for operating the pump.

In testimony that I claim the foregoing as my own, I have hereto affixed my signature in the presence of two witnesses.

WILLIAM R. HECK.

Witnesses:
PERRY L. HERRING,
H. J. TEMPLIN.